(12) United States Patent
Lindteigen

(10) Patent No.: US 8,966,249 B2
(45) Date of Patent: Feb. 24, 2015

(54) DATA SECURITY AND INTEGRITY BY REMOTE ATTESTATION

(71) Applicant: Ty Brendan Lindteigen, Chandler, AZ (US)

(72) Inventor: Ty Brendan Lindteigen, Chandler, AZ (US)

(73) Assignee: Saife, Inc. AZ (US)

( * ) Notice: Subject to any disclaimer, the term of this patent is extended or adjusted under 35 U.S.C. 154(b) by 79 days.

(21) Appl. No.: 13/738,987

(22) Filed: Jan. 10, 2013

(65) Prior Publication Data

US 2014/0143538 A1    May 22, 2014

Related U.S. Application Data

(60) Provisional application No. 61/591,987, filed on Jan. 29, 2012.

(51) Int. Cl.
*H04L 29/06* (2006.01)

(52) U.S. Cl.
CPC .......... *H04L 63/1441* (2013.01); *H04L 63/123* (2013.01)
USPC ...................................................... 713/156

(58) Field of Classification Search
CPC .......................... H04L 63/0823; H04L 9/3294
USPC ................................................. 713/156, 150
See application file for complete search history.

(56) References Cited

U.S. PATENT DOCUMENTS

| 2010/0005529 A1* | 1/2010 | Hemade .......................... 726/22 |
| 2010/0240413 A1* | 9/2010 | He et al. ........................ 455/558 |
| 2012/0254361 A1* | 10/2012 | Malkhasyan et al. .......... 709/218 |

* cited by examiner

*Primary Examiner* — Anthony Brown

(57) ABSTRACT

This invention includes apparatus, systems, and methods to ensure the security and integrity of data stored, processed, and transmitted across compute devices. The invention includes a system comprising at least one of said devices, application software installed on said devices and coupled to the device's hardware and software stack to execute data encryption and remote attestation, and said devices coupled with an attestation server through a communication network. The invention includes a process to configure said devices for data encryption and remote attestation and performing an initial inventory and content scan of the device's hardware and software stack with results transmitted across a communication network to the attestation server. The invention includes periodic inventory and content scans of the device's hardware and software stack with results transmitted again to the attestation server via the communication network. The attestation server stores said results in a database for comparison to subsequent results sent by devices. The attestation server notes any differences in the most recent results and sends an alert to the device if the device is configured differently based on the previous scan, or configured the same if no differences were noted.

21 Claims, 3 Drawing Sheets

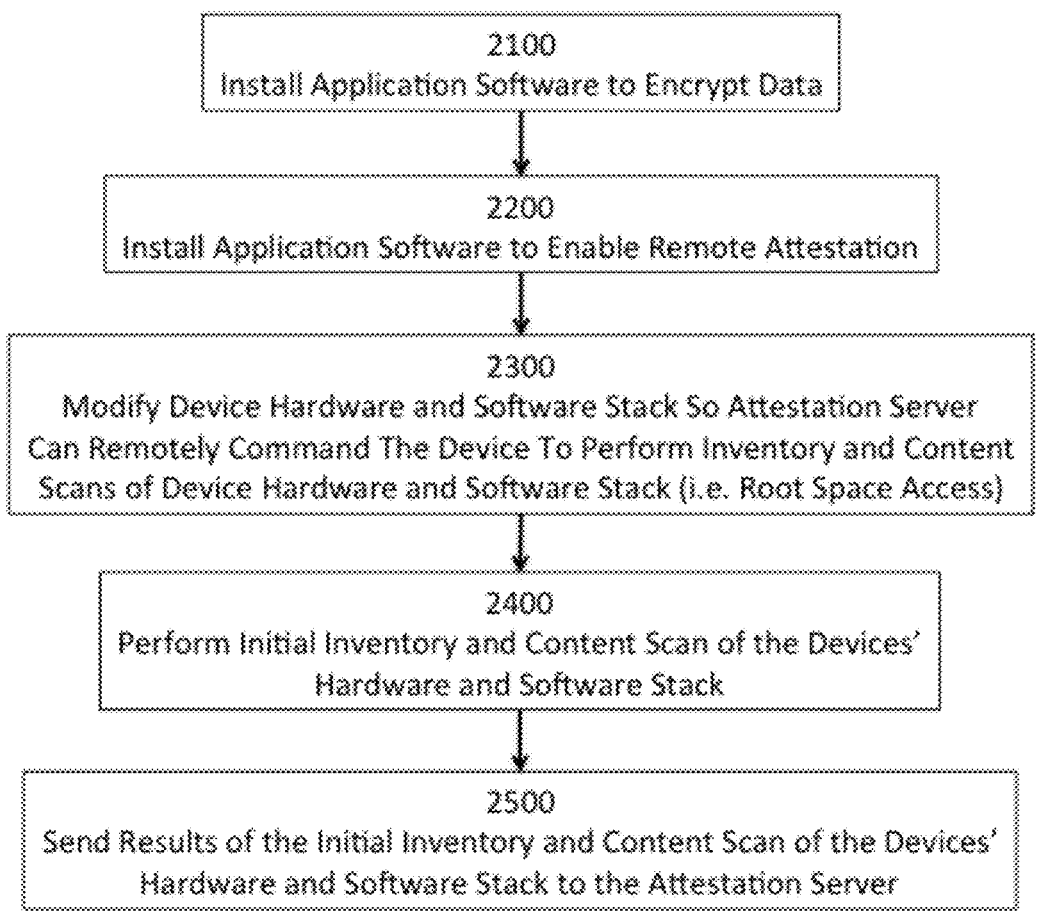

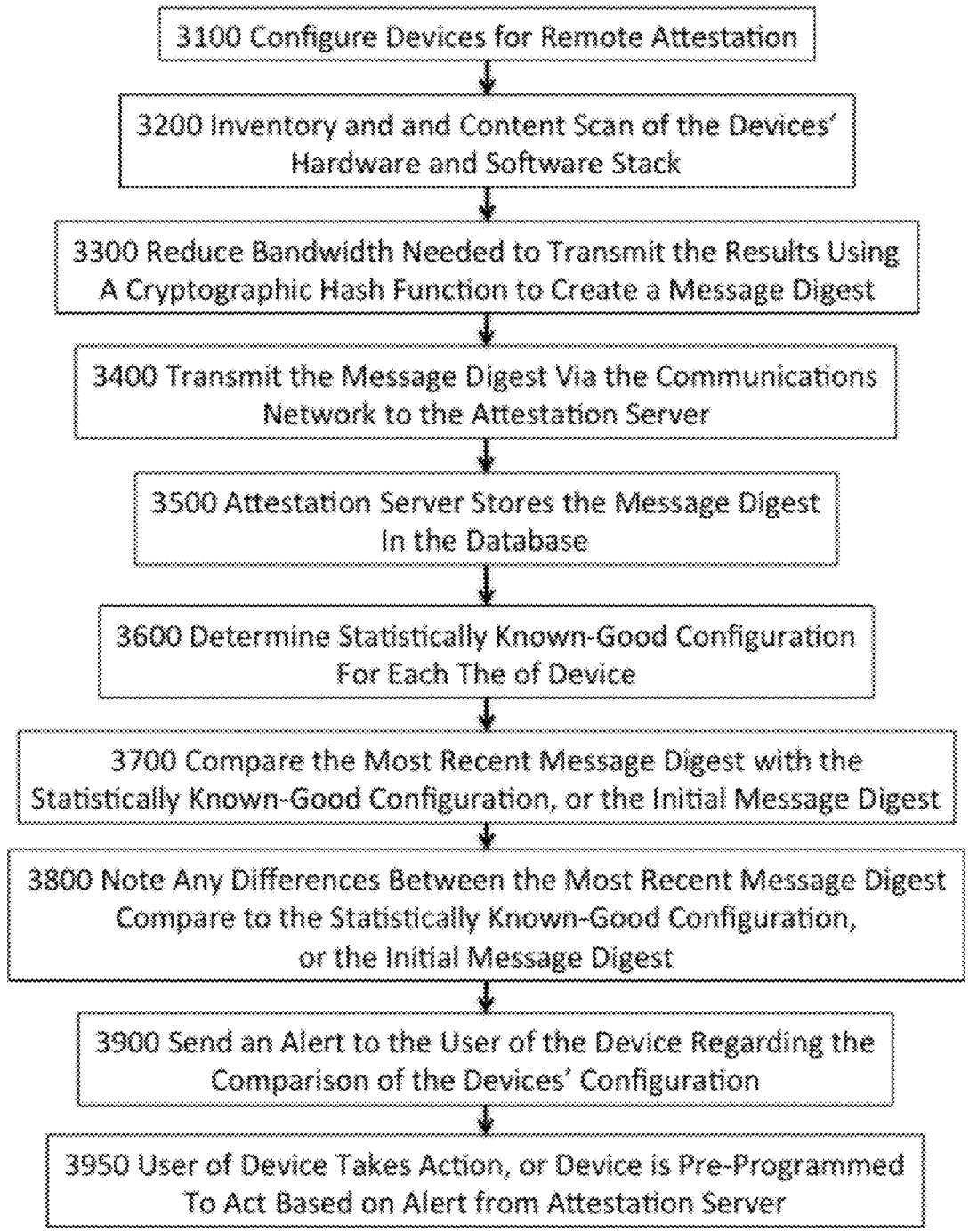

DATA SECURITY AND INTEGRITY BY REMOTE ATTESTATION

CROSS-REFERENCE TO RELATED APPLICATIONS

The present application is related to and claims priority from prior provisional application Ser. No. 61/591,987 filed Jan. 29, 2012 the contents of which are incorporated herein by reference.

FIELD OF THE INVENTION

This invention relates generally to the field of securing data, and particularly ensuring the security and integrity of data stored, processed, and transmitted across computing devices.

BACKGROUND OF THE INVENTION

Technical advances and the prolific use of communication, computing, or electronic mobile or fixed devices, such as smart phones, tablet PC's, notebook PC's, and desktop PC's, have placed powerful computers readily in the hands of many people. These powerful devices produce significant amounts of data including sensitive personal, corporate, and government interests. Malware attacks against such computing devices have become pervasive and threaten unauthorized access and use of the sensitive data. Private, corporate, and government entities have a vested interest in protecting sensitive data stored, processed, and transmitted across extensive wire and wireless communication networks. Hence, there is an urgent need for an efficient solution to prevent the unauthorized access and use of sensitive data.

Existing solutions are limited because they focus on isolating all applications from each other, as opposed to isolating the secure applications from everything else. In addition, existing techniques such as writing a new kernel in a secured development environment or virtualizing the kernel and device drivers to run under a hypervisor require device-specific software and a system image unique to each type of device. Furthermore, existing solutions such as anti-virus, spyware scanners, and firewall software and services are susceptible to malware that circumvents them by modifying the underlying platform upon which they execute, and may allow the unauthorized access and use of sensitive data.

This invention provides a solution to protect sensitive data from unauthorized access and use. This invention includes practical data separation techniques that provide granulated control of sensitive data. This solution provides a complete solution against the adverse effects of malware by combining platform integrity with secure data management. This invention provides superior advantages in the marketplace by adding platform integrity through remote attestation across several devices to determine a statistically known-good configuration compared to looking for malware signatures or whitelist of software inventories.

BRIEF SUMMARY OF THE INVENTION

In one embodiment of the invention a system to ensure the security and integrity of data stored, processed, and transmitted across communication, computing, or electronic mobile or fixed devices comprises at least one of said devices. Next, application software is installed on said devices and coupled to the device's hardware and software stack to execute data encryption and remote attestation. Next the devices are coupled to a wired or wireless communication network. Finally, the devices communicate with an attestation server through the communication network.

In another embodiment of the invention a process to secure data, and particularly ensuring the security and integrity of data stored, processed, and transmitted across communication, computing, or electronic mobile or fixed devices comprises configuring said devices for data encryption and remote attestation. Application software is installed within the device to encrypt data entering and leaving any secured applications within the device and to encrypt all data leaving the device. Next, application software is installed within the device to enable remote attestation including modifying the hardware and software stack so the attestation server will be able to remotely command the device to perform inventory and content scans of the device's hardware and software stack. Next, an initial inventory and content scan of the device's hardware and software stack is taken. Finally, the results of the inventory and content scans of the device's hardware and software stack are transmitted across a communication network to the attestation server.

In one embodiment of the invention a process to secure data, and particularly ensuring the security and integrity of data stored, processed, and transmitted across communication, computing, or electronic mobile or fixed devices comprises configuring said devices for remote attestation. Next, an inventory and content scan of the device's hardware and software stack is taken. Next, the results of the inventory and content scan of the device's hardware and software stack are consolidated and encrypted. Next, the consolidated and encrypted results of the inventory and content scan of the device's hardware and software stack is sent to the attestation server via the communication network. Next, the attestation server stores the consolidated and encrypted results of the inventory and content scan of the device's hardware and software stack in a storage database for comparison to other results sent by the devices. Next, the attestation server uses the collection of all results to determine a statistically known-good configuration for each type of device, or other criteria. Next, if this is a subsequent result, such as not the first from the particular type of device, then the attestation server compares the most recent result with the statistically known-good configuration for the particular type of device. Next, the attestation server notes any differences in the most recent result compared to either the first result, or the determined statistically known-good configuration. Finally, the attestation server sends an alert to the device that the device is configured differently than the first result, or the determined statistically known-good configuration. If no differences were noted the attestation server may send an alert to the device indicating that the device is configured the same as the first result, or the determined statistically known-good configuration.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

FIG. 2 is a diagram of an exemplary embodiment for a process to configure devices in accordance with the teachings of the present invention;

FIG. 3 is a diagram illustrating a process to ensure the security and integrity of data stored, processed, and transmitted across communication, computing, or electronic mobile or fixed devices in accordance with the teachings of the present invention.

DETAILED DESCRIPTION OF THE INVENTION

Figure 1:
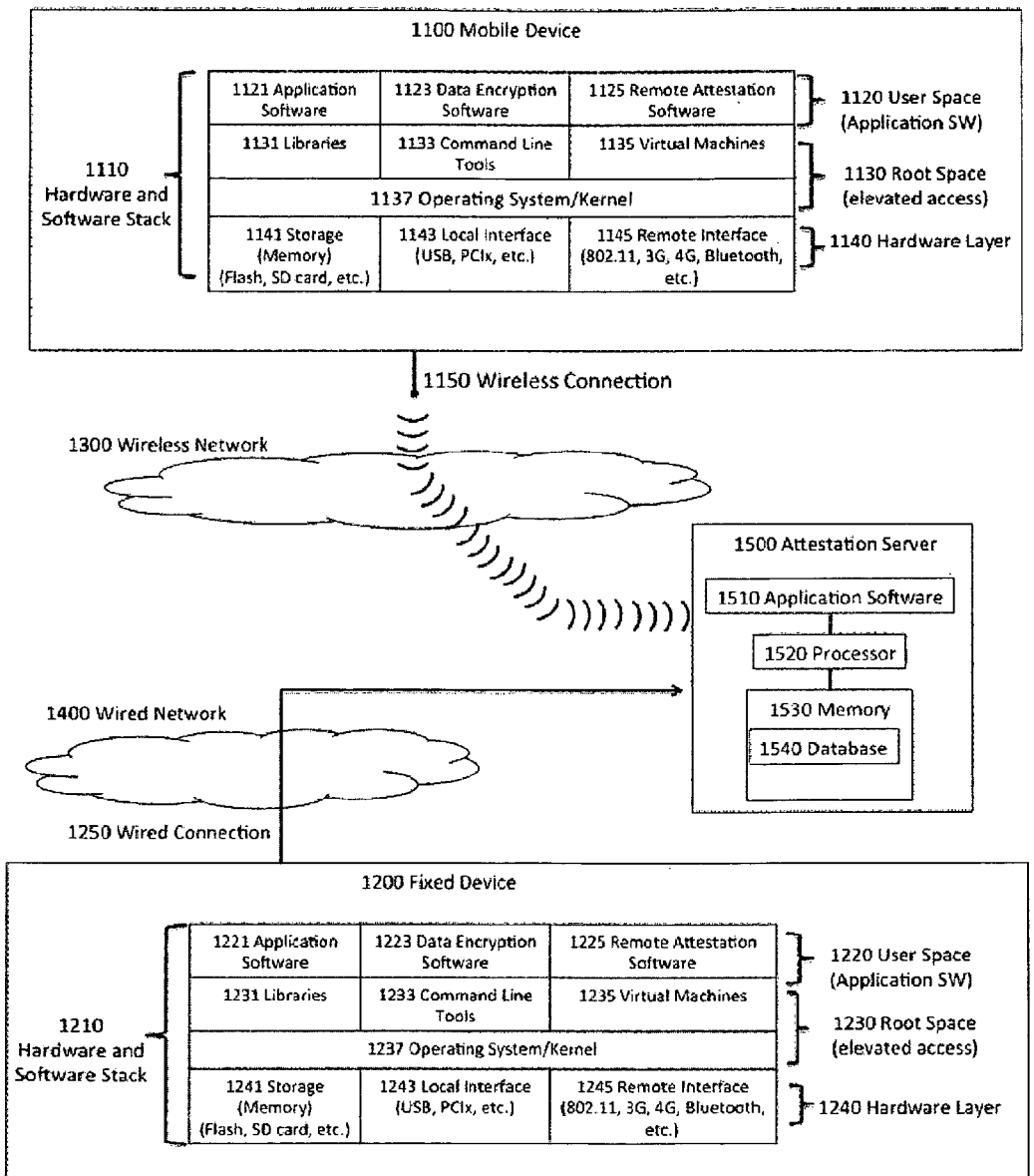
FIG. 1 is a diagram illustrating a system to ensure the security and integrity of data stored, processed, and transmitted across communication, computing, or electronic mobile or fixed devices in accordance with the teachings of the present invention.

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

FIG. 1 is a diagram of an exemplary embodiment for a system 1000 to ensure the security and integrity of data stored, processed, and transmitted amongst application software 1120 within a device 1100, or to and from other devices 1200. Data security is accomplished by encrypting data within an application 1121 to prevent unauthorized use of the data as it is transmitted to other applications within the device 1100 or when the data is transmitted out of the device 1100. This ensures that any data leaving the OS-protected address space 1137 of the application 1121 is protected. Data encryption is accomplished using data encryption application software 1123 that converts a plaintext message into cipher text that can be decoded back into the original message, such as the block or stream cipher based encryption schemes.

Data encryption provides limited protection from unauthorized use, because the data is still subject to malicious use via direct-memory 1141 access while the application is executing. It may not be possible for an application 1121 to detect when its memory 1141 is being read. However it is possible to detect when an application requests kernel, or super-user, privileges on the device 1100. Elevated access 1130 to the kernel 1137 are required for an application, such as malware, to read another application's memory. There are also other methods to detect when malware has altered a device's hardware and software stack 1110 such as monitoring changes in software executables that report what processes are running on the device 1100 and with what privileges; or monitoring the contents of the boot partition of persistent memory, such as flash memory 1141, to detect rootkits. Typical malware detection and removal solutions such as antivirus, spyware, firewalls, trusted platform modules, and tripwire are limited because rootkits have methods of modifying underlying device components in a manner that allows malware to evade detection by typical malware detection and removal solutions. To counter this integrity issue, the invention takes an initial inventory and content scan of the device's hardware and software stack 1110 when it is in a known-good configuration. The software stack may include different components such as applications, application framework, libraries, OS, kernel, and drivers.

The known-good configuration may include the state when the device 1100 is originally configured at the factory, by a user, or an IT entity. The known-good configuration may also be determined statistically by comparing the configuration of multiple similar devices. Periodic monitoring of the device's hardware and software stack 1110 and comparisons to the known-good condition further ensures the device's 1100 integrity.

The devices 1100 and 1200 may include smart phones, tablet PC's, notebook PC's, desktop PC's, remote monitoring devices, cameras, sensors, or any other device that transmits data across applications within the device, or transmits data out of the device. The devices 1100 and 1200 may be used for any type of communication, computing, or electronic operation. The invention is also applicable to both mobile devices 1100 and fixed devices 1200 since either type typically includes multiple software applications 1120 and 1220 that transmit data to and from each other. Likewise mobile 1100 and fixed 1200 devices are commonly used to transmit data to and from other mobile and fixed devices.

Next, application software 1121 is installed on the device 1100. The application software 1121 may include any type of software that stores, processes, or transmits data to other applications on the device, or to other devices such as internet browsers, email, word processing, gaming, data analysis, software applications.

The device 1100 also includes application software designed specifically to perform data encryption 1123 and remote attestation software 1125. This application software is installed within the device 1100 and coupled to the device's hardware and software stack 1110. For example, the application software 1120 is installed within the user space of the device's software stack 1110 and associated with various hardware 1140 on the device such as data storage 1141, local interfaces 1143, and remote interfaces 1145. The data storage 1141 may include persistent memory such as flash that may be subdivided for example into user data, system image, and boot partitions.

Next the device 1100 is coupled to a wired 1250 or wireless 1150 communication network. The communication network may include a public or private network such as the internet, intranet, telecommunications system, or other network capable of transmitting electronic data.

Finally, the device 1100 communicates with an attestation server 1500 through the communication network 1300. The remote attestation server 1500 may be a server, router, personal computer, or other device capable of receiving data communicated to and from the mobile 1100 or fixed 1200 devices. The remote attestation server 1500 includes hardware and software components such as a communication network interface, database 1540, memory 1530, processor 1520, and application software 1510. The database 1540 is used to store data received from the mobile 1100 or fixed 1200 devices. The database 1540 may be stored in memory 1530 within the attestation server 1500, or in memory outside the attestation server 1500 and retrieved upon request, including volatile and non-volatile memory such as flash, cache, RAM, ROM, solid state drives, hard disk drives, or secondary memory such as tape, magnetic disks and optical discs. The processor 1520 carries out the instructions of the application software 1510 performing the basic arithmetical, logical, and input/output operations of the attestation server 1500.

The application software 1510 installed on the attestation server 1500 provides the instructions to remotely command the device 1100 to perform inventory and content scans of the device's hardware and software stack 1110. The application software 1510 also provides the instructions to: consolidate and secure the results of the inventory and content scan of the device's hardware and software stack 1110; store the results in a storage database 1540; to use the collected results to determine a statistically known-good configuration for each type of device; to compare the results with the statistically known-good configuration for the particular type of device; to note any differences in the most recent message digest compared to the determined statistically known-good configuration; and to send an alert to the device 1110.

FIG. 2 is a diagram of an exemplary embodiment of a process 2000 for configuring the devices for data encryption and remote attestation. Application software is installed 2100 in the device to encrypt data entering and leaving any secured applications within the device, and all data leaving the device. Data security is accomplished by encrypting data within the application to prevent unauthorized use of the data as it is transmitted to other applications within the device or when the data is transmitted out of the device. This ensures that any data leaving the OS-protected address space of the secure application is protected. The data encryption is accomplished using a data encryption process that converts a plaintext message into cipher text that can be decoded back into the original message, such as the block or stream cipher based encryption schemes.

Next, application software is installed 2200 in the device to enable remote attestation including modifying 2300 the hardware and software stack so the attestation server will be able to remotely command the device to perform inventory and content scans of the device's hardware and software stack. This includes providing direct access to the device's memory because the remote attestation process includes monitoring requests from malicious applications for elevated permissions and scanning critical platform items such as drivers, and memory user data, system image, and boot partitions. Additionally the application software includes commands and instructions to take an initial and periodic inventory and content scans 2400 of the device's hardware and software stack when it is in a known-good state. The inventory and scan include a variety of tasks such as the boot image of the device, the system image that contains the operating system, any user-programmable areas that contain software or data files, and an inventory of software installed on the device. Finally, the results of the initial inventory and content scan of the device's hardware and software stack are transmitted 2500 across a communication network to the attestation server.

FIG. 3 is a diagram of an exemplary embodiment 3000 to secure data, and particularly ensuring the security and integrity of data stored, processed, and transmitted across communication, computing, or electronic mobile or fixed devices comprises configuring 3100 said devices for remote attestation. Next, an inventory and content scan 3200 of the device's hardware and software stack are taken. The inventory and scan include a variety of tasks including the boot image of the device, the system image that contains the operating system, any user-programmable areas that contain software or data files, and an inventory of software installed on the device. This invention does not require that a good configuration be known. Instead the invention provides a process to gather the results of multiple inventory and content scans of a particular type of device. Each particular device is expected to generate a signature result. The invention determines a statistical known-good configuration based on the signature result of multiple devices. Thus the results of a device can be compared to the statistically determined known-good configuration of similar device types.

In order to reduce the bandwidth needed to transmit the results of the inventory and content scan of the device's hardware and software stack, the results are compressed and encrypted 3300 using an algorithm such as a cryptographic hash function. The cryptographic hash function is a deterministic procedure that takes an arbitrary block of data and returns a fixed-size bit string, commonly referred to the hash value or message digest. Any change to the data, accidental or intentional, will change the hash value. Thus the message digest can be used to determine when there is a change to the device's hardware or software stack, which may indicate a malicious attack on the device's data or platform integrity. Next the results of the inventory and content scan of the device's hardware and software stack are transmitted 3400 across a communication network to the attestation server in the form of the secure and compressed message digest. The attestation server coordinates the application software instructions, database, collection of message digest data, and processor to determine a statistically known-good configuration for the devices.

Next, the attestation server stores 3500 the message digest in a storage database for comparison to subsequent message digests sent by the devices. The database is used to store message digests received from the devices. The database may be stored in physical memory within the attestation server including volatile and non-volatile memory such as flash, cache, RAM, ROM, solid state drives, hard disk drives, or secondary memory such as tape, magnetic disks and optical discs, or in memory outside the attestation server.

Next, the attestation server uses the collection of message digests to determine a statistically known-good configuration 3600 for each type of device. The attestation server's application software provides the instructions to store the message digest in a storage database. The database keeps track of all message digests from all devices including separating the data by the device type. For example, all data from a particular type of smartphone will be stored and processed together. The attestation server will use the data from a particular type of device to determine a statistically known-good configuration. For example, the attestation server may use the collection of data to determine the statistically known-good configuration relative to the average, mean, a range, or any other statistically determined criteria of cryptographic hash values—or message digest values—reported by multiple devices of the same type. Thus an anomaly may be detected when a device reports a message digest value different from the determined statistically known-good configuration. The attestation server may also store and process message digest values based on other traits such as the geography the devices are located, manufacturer, brand, the user's function, permissions granted, etc.

Next, the attestation server compares 3700 the most recent message digest to the determined statistically known-good configuration for a similar type of device. The attestation server determines if there are any differences 3800 in the most recent message digest compared to the determined statistically known-good configuration. The comparison may include any difference determined to be indicative of an anomaly, and thus an indication that the device was altered. For example, the attestation server may be programmed to indicate that the device was altered by malware if the most recent message digest differs by a value known to indicate the signature of malware. If this is the initial message digest then the results are stored in the database for future reference.

Next, the attestation server sends an alert to the user of the device. The alert indicates whether the device is configured differently than the initial message digest, or differently than the determined statistically known-good configuration for the same type of device, or other comparison criteria. Likewise the alert may indicate that there were no differences noted and the device is configured the same as the configuration associated with the initial message digest, or the determined statistically known-good configuration for similar type of devices, or other comparison criteria. It may also be advantageous for the alert to be provided to the user by an alternate means outside the control of the device such as by browser, email, call, or text message on a different device—thus avoiding spoofing by the malware.

Finally, the user of the device may take action 3950 if the user considers the device to be comprised by malicious changes to the device's software or hardware stack. The device may also be programmed to automatically take actions to minimize or eliminate the threat of malicious attacks on the device. For example, the device may automatically power off, be removed from a network, or re-configured back to a known-good condition.

Additional services may be built on top of the remote attestation system to further enhance the security of the device. For example, services such as generating a manifest of installed software to compare against a central whitelist database; remote software installation and removal for both secure and commercial software; and generating a report of permissions granted to installed software as well as providing remote modification of those permissions.

Throughout this description, references were made to devices coupled together. Such coupling includes a manner that allows the exchange and interaction of data, such that the operations and processes described may be carried out. For example, the devices may be coupled with electrical circuitry, or through wireless networks that allow the devices to transfer data, receive power, execute the operations described, and provide structural integrity. Reference was also made to interactions between a device, communication network, and an attestation server, however the invention is scalable to be enabled with more devices, networks, and attestation servers than described in the specification. For example, any number of devices, networks, or attestation servers may be utilized to enable this invention.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A system to ensure the security and integrity of data stored, processed, and transmitted across devices comprising:
    at least one device;
    an application software installed on the device and coupled to the a hardware and a software stack of the device;
    a data encryption software and a remote attestation software installed on the device and coupled to the hardware and software stack of the device;
    the device coupled to a communication network;
    an attestation server to communicate with the device via the communication network; and
    wherein the application software provides a set of instructions to remotely command the device to: perform an inventory scan and a content scan of the hardware and the software stack of the device, consolidate and secure a collection of results of the inventory scan and the content scan of the hardware and the software stack of the device, store the collection of results in a storage database, use the collection of results to determine a statistically known-good configuration for a type of device, compare the collection of results with the statistically known-good configuration for the type of device, note any differences in a most recent message digest compared to the statistically known-good configuration, and send an alert to the device.

2. The system of claim 1, wherein an initial inventory and content scan of the hardware and the software stack of the device is taken when the device is in a known-good configuration.

3. The system of claim 2, wherein the known-good configuration is determined statistically by comparing a configuration of a multitude of similar devices.

4. The system of claim 1, wherein the application software comprises software that stores, processes, or transmits data to other applications on the device, or to other devices such as internet browsers, email, word processing, gaming, data analysis, software applications.

5. The system of claim 1, wherein the data encryption software and the remote attestation software is installed within a user space of the software stack of the device and associated with a various set of hardware on the device including a data storage, a local interface, and a remote interface.

6. A method to ensure the security and integrity of data stored, processed, and transmitted across a multitude of devices comprising:
    installing a first application software within a device that encrypts a set of data entering and leaving any secured applications within the device and encrypts all the sets of data leaving the device;
    installing a second application software within the device that enables remote attestation including modifying the hardware and software stack of the device so an attestation server will be able to remotely command the device to perform an inventory scan and a content scan of the hardware and software stack of the device;
    taking the inventory scan and the content scan of the hardware and software stack of the device;
    compressing and encrypting a set of results from the inventory scan and the content scan of the hardware and software stack of the device to yield a compressed and encrypted set of results of the inventory and content scan of the hardware and software stack of the device;
    sending the compressed and encrypted set of results of the inventory and content scan of the hardware and software stack of the device to the attestation server via a communication network;
    storing the compressed and encrypted set of results of the inventory and content scan of the hardware and software stack of the device in a storage database for comparison to a collection of results sent by other devices;
    using the collection of results sent by the other devices to determine a statistically known-good configuration for each type of device, and when this is not a first set of results of the inventory and content scan of the hardware and software stack of the device for a particular type of device, then comparing the most recent set of results of the inventory and content scan of the hardware and software stack of the device with the statistically known-good configuration for the particular type of device;
    noting any differences in the most recent set of results of the inventory and content scan of the hardware and software stack of the device compared to either the first set of results of the inventory and content scan of the hardware and software stack of the device, or the statistically known-good configuration for the particular type of device;
    sending an alert to the device that the device is configured differently than the first set of results of the inventory and content scan of the hardware and software stack of the device, or the statistically known-good configuration for the particular type of device; and if no differences were noted, sending an alert to the device indicating that the device is configured the same as the first set of results of the inventory and content scan of the hardware and software stack of the device, or the statistically known-good configuration for the particular type of device.

7. The method of claim 6, wherein the inventory and content scan of the hardware and software stack of the device include capturing a boot image of the device, a system image that contains an operating system, any user-programmable areas that contain a software or a data file, and an inventory of software installed on the device.

8. The method of claim 6, wherein a set of results for a multiple of the inventory scans and the content scans of a particular type of device are gathered to determine a signature result for the particular type of device.

9. The method of claim 6, wherein the statistical known-good configuration is determined based on a signature result of multiple devices.

10. The method of claim 6, wherein the encryption of the set of results from the inventory scan and the content scan of the hardware and software stack uses a cryptographic hash function that takes an arbitrary block of data and returns a fixed-size bit string hash value, wherein any change to the arbitrary block of data, accidental or intentional, will change the fixed-size bit string hash value, thus the fixed-size bit string hash value can be used to determine when there is a change to the hardware or software stack of the device indicating a malicious attack to the data or platform integrity of the device.

11. The method of claim 10, wherein the attestation server stores a hash value in a storage database for comparison to subsequent hash values sent by the other devices.

12. The method of claim 10, wherein the attestation server uses a collection of hash values to determine a statistically known-good configuration for each type of a device.

13. The method of claim 6, wherein the storage database is stored in a physical memory within the attestation server including a volatile or a non-volatile memory such as flash, cache, RAM, ROM, solid state drives, hard disk drives, or secondary memory such as tape, magnetic disks and optical discs.

14. The method of claim 6, wherein the storage database keeps track of all the hash values from all the devices including separating the data by the type of the device and uses the data from a particular type of device to determine the statistically known-good configuration relative to an average, a mean, a range, or any other statistically determined criteria of the hash values reported by the multiple devices of a same type, thus detecting an anomaly when the device reports a hash value different from the statistically known-good configuration.

15. The method of claim 6, wherein the attestation server stores and processes a hash value based on other traits such as a location of the devices, a manufacturer of the device, a brand of the device, a function of a user, or a granted permissions.

16. The method of claim 6, wherein the attestation server compares a most recent hash value to the statistically known-good configuration for a similar type of device to determine if there are any differences in a most recent message digest compared to the statistically known-good configuration.

17. The method of claim 6, wherein the attestation server is programmed to indicate that the device was altered by a malware prom if a most recent hash value differs by a value known to indicate a signature of the malware program.

18. The method of claim 6, wherein the attestation server sends an alert to a user of the device indicating the device is configured differently than the known-good configuration for a same type of device.

19. The method of claim 18, wherein the alert is provided to a user by an alternate means outside the control of the device such as by an Internet browser, email, call, or text message on a different device.

20. The method of claim 6, wherein a user of the device takes an action if the user considers the device to be comprised by a malicious change to the software or hardware stack of the device.

21. The method of claim 6, wherein the device is programmed to automatically take an action to eliminate a threat of malicious attacks on the device such as automatically powering off, being removed from a network, or re-configuring back to the known-good condition.

* * * * *